United States Patent
Ahn et al.

(10) Patent No.: US 9,502,694 B2
(45) Date of Patent: Nov. 22, 2016

(54) POUCH FOR SECONDARY BATTERY AND SECONDARY BATTERY INCLUDING THE SAME

(71) Applicant: LG CHEM, LTD., Seoul (KR)

(72) Inventors: Chang Bum Ahn, Daejeon (KR); Hyuk Su Kim, Daejeon (KR); Jun Woo Huh, Daejeon (KR); Hyang Mok Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/274,959

(22) Filed: May 12, 2014

(65) Prior Publication Data

US 2015/0147633 A1    May 28, 2015

Related U.S. Application Data (63) Continuation of application No. PCT/KR2013/010851, filed on Nov. 27, 2013.

(51) Int. Cl.
*H01M 2/02* (2006.01)
*H01M 10/04* (2006.01)

(52) U.S. Cl.
CPC ........... *H01M 2/021* (2013.01); *H01M 2/0212* (2013.01); *H01M 2/0237* (2013.01); *H01M 2/0262* (2013.01); *H01M 2/0277* (2013.01); *H01M 2/0287* (2013.01); *H01M 10/0413* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 2002/0160257 A1 | 10/2002 | Lee et al. | |
| 2002/0160258 A1 | 10/2002 | Lee et al. | |
| 2003/0013012 A1 | 1/2003 | Ahn et al. | |
| 2007/0154799 A1* | 7/2007 | Yoon | H01M 2/1005 429/176 |
| 2008/0171259 A1 | 7/2008 | Kanai et al. | |
| 2010/0310928 A1 | 12/2010 | Roh et al. | |
| 2011/0311862 A1* | 12/2011 | Ahn | 429/185 |
| 2012/0219847 A1 | 8/2012 | Hong et al. | |
| 2013/0071696 A1 | 3/2013 | Kim et al. | |
| 2013/0083453 A1 | 4/2013 | Kobayashi | |

FOREIGN PATENT DOCUMENTS

| | | |
|---|---|---|
| EP | 1744383 A1 | 1/2007 |
| JP | 10-112296 A | 4/1998 |
| JP | 10-189055 A | 7/1998 |
| JP | 2000-182579 A | 6/2000 |
| JP | 2000-200588 A | 7/2000 |
| JP | 2004-47173 A | 2/2004 |
| JP | 2006-179442 A | 7/2006 |
| JP | 2007-073322 A | 3/2007 |
| JP | 2008-004506 A | 1/2008 |
| JP | 2012-169222 A | 9/2012 |
| KR | 10-2001-0082058 A | 8/2001 |
| KR | 10-2001-0082059 A | 8/2001 |
| KR | 10-2001-0082060 A | 8/2001 |
| KR | 10-2002-0061898 A | 7/2002 |
| KR | 10-2007-0012809 A | 1/2007 |
| KR | 10-2010-0130896 A | 12/2010 |
| KR | 10-2012-0056316 A | 6/2012 |
| KR | 10-2012-0097312 A | 9/2012 |
| WO | WO 2012/002058 A1 | 1/2012 |

OTHER PUBLICATIONS

Extended European Search Report, dated Dec. 2, 2015, for European Patent Application No. 13838061.3.

* cited by examiner

*Primary Examiner* — Ladan Mohaddes
(74) *Attorney, Agent, or Firm* — Birch, Stewart, Kolasch & Brich, LLP (57) ABSTRACT

Provided are a pouch for a secondary battery including a first sheet and a second sheet, and a frame unit which is sealed by the first sheet and the second sheet and includes an accommodating part for accommodating an electrode assembly including electrode tabs therein, and a secondary battery including the pouch. According to the present invention, since a structure of a pouch for a secondary battery may include a frame unit capable of accommodating a large electrode assembly, a high-capacity and large-area secondary battery having high capacity and high stiffness may be realized.

21 Claims, 8 Drawing Sheets

POUCH FOR SECONDARY BATTERY AND SECONDARY BATTERY INCLUDING THE SAME

CROSS-REFERENCE TO RELATED APPLICATION

This application is a Continuation of PCT International Application No. PCT/KR2013/010851 filed on Nov. 27, 2013, which is hereby expressly incorporated by reference into the present application.

BACKGROUND OF THE INVENTION

Field of the Invention

The present invention relates to a pouch for a secondary battery which includes a frame unit including an accommodating part for accommodating an electrode assembly, and a secondary battery including the pouch.

Description of the Related Art

Recently, lithium secondary batteries, which are chargeable/dischargeable and lightweight and have high energy density and high output density, have been widely used as energy sources for wireless mobile devices. Lithium secondary batteries have also attracted considerable attention as power sources for hybrid electric vehicles (HEVs), plug-in hybrid electric vehicles (PHEVs), battery electric vehicles (BEVs), and electric vehicles (EVs), which have been developed to solve limitations such as air pollution and green-house gases that are caused by existing internal combustion engine vehicles that use fossil fuels such as gasoline and diesel vehicles.

Lithium secondary batteries are classified by electrode type into lithium ion batteries that use liquid electrolyte and lithium polymer batteries that use polymer electrolyte. Further, lithium secondary batteries are classified into cylindrical-type, prismatic-type, or pouch-type lithium secondary batteries according to the shape of their casing in which an electrode assembly is accommodated.

Among these, the pouch-type lithium secondary battery has a pouch exterior including a metallic layer (foil) and a multi-layered synthetic resin film which are applied to top and bottom surfaces of the metallic layer. Thus, the pouch-type lithium secondary battery may be developed as a lightweight lithium secondary battery and changed into various shapes because it is possible to significantly reduce the weight of the battery in comparison with the cylindrical-type or prismatic-type secondary lithium secondary battery which utilizes a metallic can.

The pouch exterior includes upper and lower exteriors which are formed by folding a middle portion of one side of a rectangular casing in a longitudinal direction. Here, press processing may be performed on the lower exterior to form a space part for accommodating an electrode assembly. Various electrode assembles having a structure, in which a cathode, a separator, and an anode that have mainly plate shapes are stacked, are accommodated in the space part of the lower exterior. Then, an electrolyte is injected, and edges around the space part of the lower exterior are closely attached to edges of the upper exterior corresponding to the lower exterior. Thereafter, the closely attached portions are thermally welded to form the sealed pouch-type secondary battery.

Figure 1:
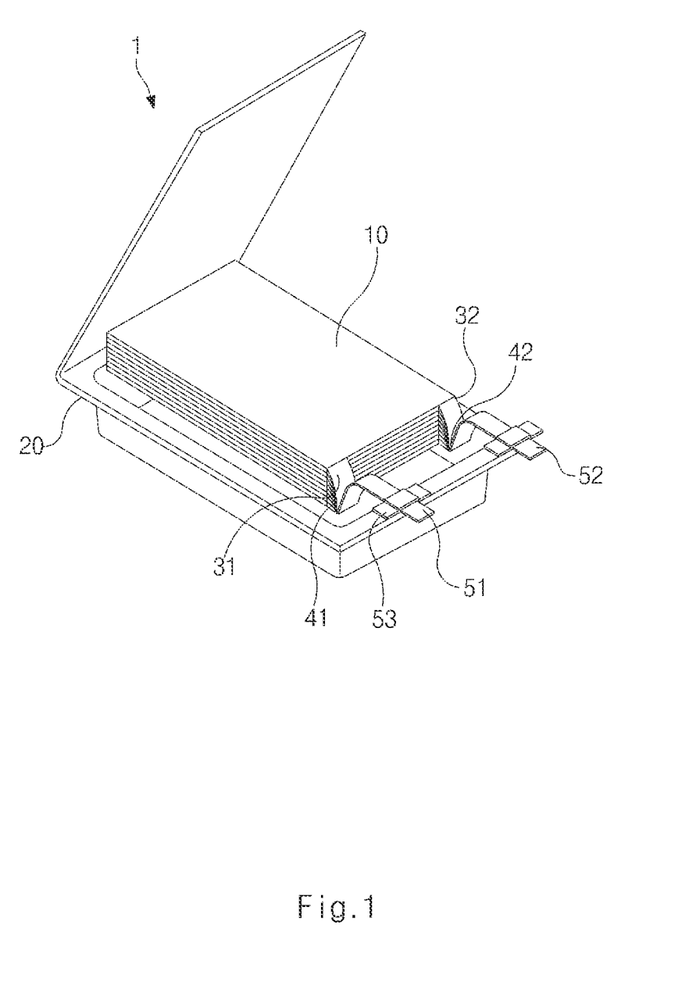
FIG. 1 is a schematic view illustrating a typical pouch-type secondary battery.

FIG. 1 is a schematic exploded perspective view illustrating a general structure of a representative pouch-type secondary battery according to a related art.

Referring to FIG. 1, a pouch-type secondary battery 1 includes an electrode assembly 10, electrode tabs 31 and 32 extending from the electrode assembly 10, electrode leads 51 and 52 welded to the electrode tabs 31 and 32, and a battery case 20 accommodating the electrode assembly 10.

The electrode assembly 10 may be a power generation device in which a cathode and an anode are successively stacked with a separator therebetween. The electrode assembly 10 has a stacked or stacked/folded type structure. The electrode tabs 31 and 32 extend from electrode plates of the electrode assembly 10, respectively. The electrode leads 51 and 52 are electrically connected to the plurality of electrode tabs 31 and 32 respectively extending from the electrode plates through welding, respectively. Here, a portion of each of the electrode leads 51 and 52 is exposed to the outside of the battery case 20. Also, an insulation film 53 may be attached to a portion of each of top and bottom surfaces of the electrode leads 51 and 52 to enhance sealability and secure electrical insulation with respect to the battery case 20.

Also, the electrode tabs 31 and 32 are integrally coupled to form welded portions, respectively. Thus, an inner, upper end of the battery case 20 is spaced a predetermined distance from a top surface of the electrode assembly 10, and each of the tabs 31 and 32 of the welded portions is bent in an approximately V shape (hereinafter, coupled portions of the electrode tabs and the electrode leads are called V-forming portions 41 and 42). The battery case 20 is formed with an aluminum laminate sheet and provides a space for accommodating the electrode assembly 10. Also, the battery case 20 has an overall pouch shape. After the electrode assembly 10 is built in an accommodation part of the battery case 20, and then an electrolyte (not shown) is injected, outer circumferential surfaces at which an upper laminate sheet and a lower laminate sheet of the battery case 20 contact each other are thermally welded to manufacture the secondary battery.

With respect to secondary batteries, there is a growing demand for medium-large-sized batteries for vehicles and energy storage, and the medium-large-sized batteries tend to be continuously thicker as large and high-energy cells are developed. Also, since the number of parallel connections of the battery must be reduced to obtain a cost reduction effect (in terms of module, pack assembly, and cell price), an increase in the capacity of cells tends to be accelerated.

With respect to the increase in the capacity of cells, stable reliability may not be secured by a method of accommodating an electrode assembly in a fused structure of an upper sheet and a lower sheet, i.e., a typical structure of a pouch. That is, the upper and lower sheets of the pouch have a structure in which a polymer layer and an aluminum sheet are stacked. However, since cracks may occur in the sheets themselves during a forming process as the thickness of the electrode assembly increases, a metal part may be exposed. As a result, the lifetime of the cell may be decreased.

SUMMARY OF THE INVENTION

An aspect of the present invention provides a pouch for a secondary battery which may realize a high-capacity secondary battery having high capacity and high stiffness by including a frame unit capable of accommodating a large electrode assembly in the pouch for a secondary battery, and a secondary battery including the pouch.

According to an aspect of the present invention, there is provided a pouch for a secondary battery including a first sheet and a second sheet; and a frame unit which is sealed by the first sheet and the second sheet and includes an accommodating part for accommodating an electrode assembly including electrode tabs therein.

According to another aspect of the present invention, there is provided a secondary battery including the pouch for a secondary battery and an electrode assembly in the pouch.

According to another aspect of the present invention, there is provided a medium-large-sized battery module or a battery pack including the secondary battery.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Accordingly, since the embodiments set forth in the present specification and the configurations illustrated in the drawings are shown by way of example and do not represent all the technological spirit of the present invention, it should be understood that embodiments of the present invention are capable of various modifications, equivalents, and alternatives at the time of present application.

A pouch for a secondary battery according to an embodiment of the present invention may include a first sheet and a second sheet; and a frame unit which is sealed by the first sheet and the second sheet and includes an accommodating part for accommodating an electrode assembly including electrode tabs therein.

Since the pouch for a secondary battery according to the embodiment of the present invention includes the frame unit capable of accommodating a high-capacity and large-area electrode assembly, a high-capacity secondary battery having high capacity and high stiffness may be realized.

Figure 2:
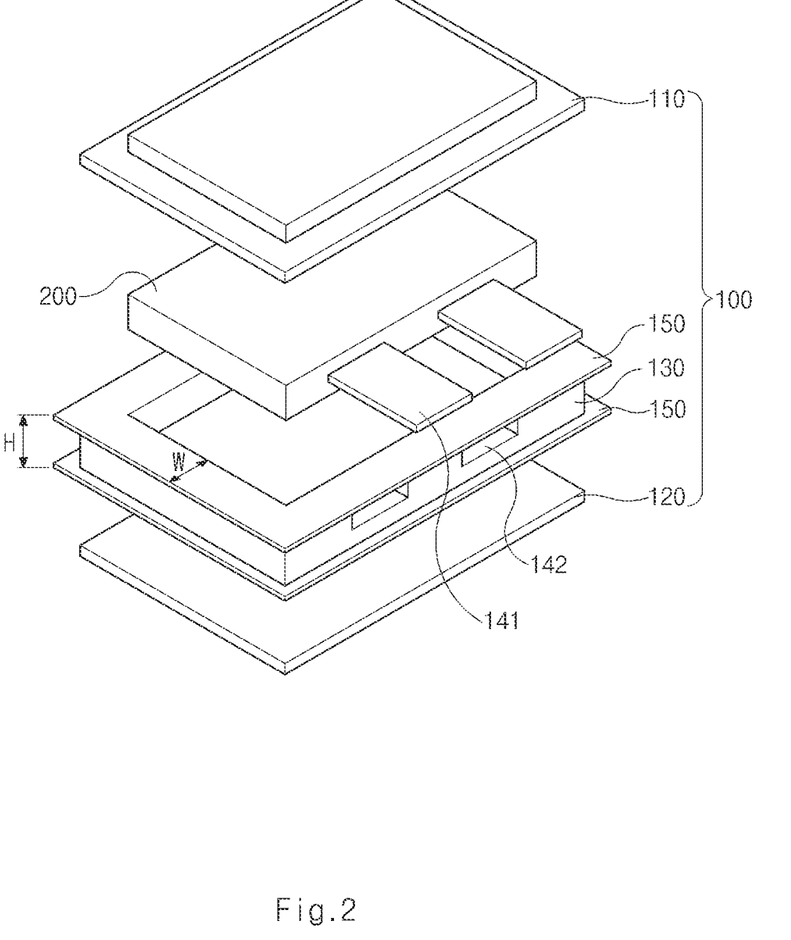
FIG. 2 is an exploded perspective view illustrating a pouch for a secondary battery according to a first embodiment of the present invention.
Figure 3:
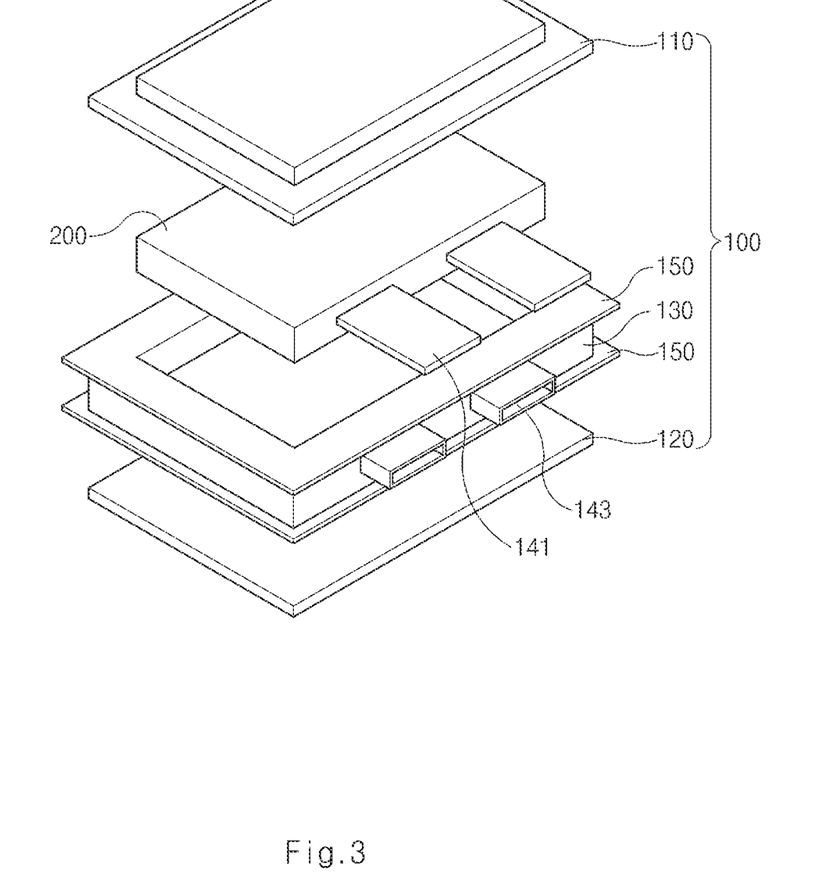
FIG. 3 is an exploded perspective view illustrating a pouch for a secondary battery according to a second embodiment of the present invention.
Figure 4:
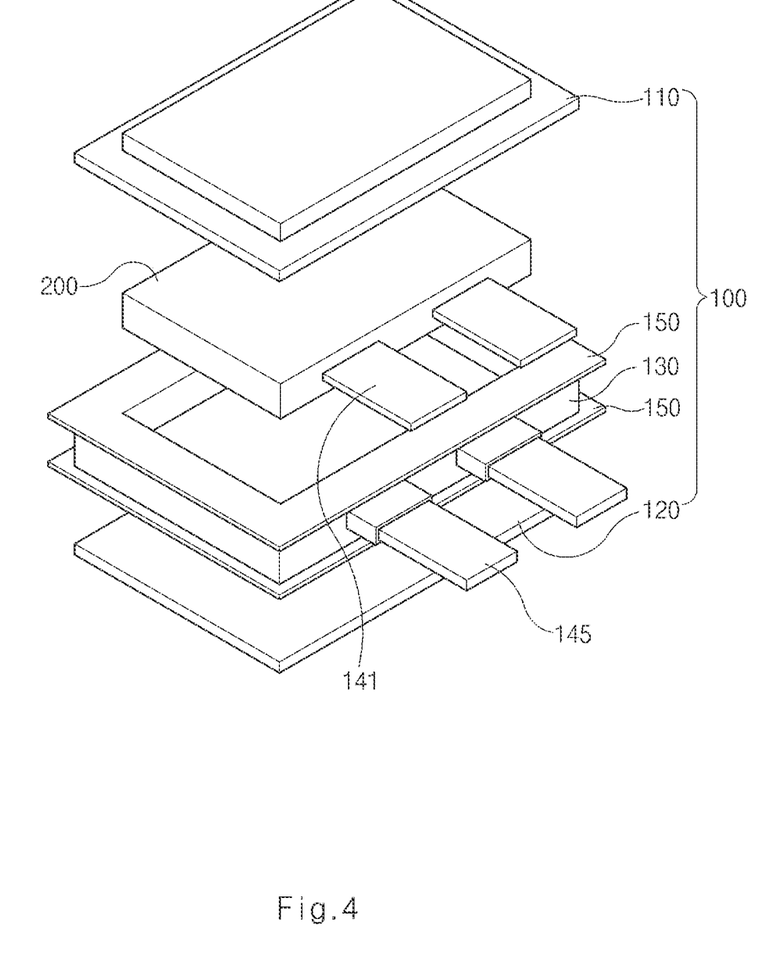
FIG. 4 is an exploded perspective view illustrating a pouch for a secondary battery according to a third embodiment of the present invention.

FIGS. 2 to 4 illustrate exploded perspective views illustrating a pouch for a secondary battery 100 according to an embodiment of the present invention. Referring to FIGS. 2 to 4, the pouch for a secondary battery 100 may include a first sheet 110 and a second sheet 120, and a frame unit 130 which may be sealed by the first sheet 110 and the second sheet 120 and includes an accommodating part for accommodating an electrode assembly 200 including electrode tabs 141 therein.

As illustrated in FIGS. 2 to 4, the first sheet 110 and the second sheet 120 may be embodied in a structure in which the first sheet 110 and the second sheet 120 are disposed to face each other having the frame unit 130 disposed therebetween, and the first sheet 110 may be processed to have a predetermined shape in consideration of a height of the electrode assembly 200.

The first sheet 110 and the second sheet 120 may be formed of a typically used aluminum laminate sheet, and may be sealed to the frame unit 130 by including a sealant layer formed of one selected from the group consisting of modified polyethylene, modified polypropylene, an acryl resin, a modified acryl resin, an epoxy-based resin, and a phenol-based resin, or a mixture thereof on each surface of the first sheet 110 and the second sheet 120 that is in close contact with the frame unit 130.

Also, the frame unit 130 may include sealing parts 150 formed of the same material as the sealant layer of the first sheet 110 and the second sheet 120 respectively on the surfaces that are in close contact with the first sheet 110 and the second sheet 120, and may be tightly sealed with the first sheet 110 and the second sheet 120 by the sealing parts 150.

In the frame unit 130, sidewalls may be formed to form an accommodating space of the electrode assembly 200, and for example, the sidewalls may be composed of four sidewalls.

According to an embodiment of the present invention, a height H of the frame unit 130 may be variously changed according to the height of the electrode assembly 200, and the height H may be in a range of 7 mm to 50 mm, for example, 10 mm to 35 mm.

A width W of the frame unit 130 may be in a range of 7 mm to 30 mm, for example, 7 mm to 15 mm. In this case, the width W of the frame unit 130 denotes a direction perpendicular to the height H of the frame unit 130.

A structure including the frame unit, according to the present invention, may be used in a high-capacity and large-area battery beyond the limits of a typical forming method of a pouch.

As illustrated in FIG. 2, according to a first embodiment of the present invention, the pouch 100 for a secondary battery may include through holes 142, through which the electrode tabs 141 included in the electrode assembly 200 penetrate, on one side of the frame unit 130 or respectively on two opposite sides of the frame unit 130, and the electrode tabs 141 of the electrode assembly 200 may penetrate through the through holes 142 of the frame unit 130. In this case, the electrode tabs 141 included in the electrode assembly 200 may include a cathode tab and an anode tab, and the cathode tab and the anode tab may extend outward in the same direction or two directions from the electrode assembly 200.

As illustrated in FIG. 3, according to a second embodiment of the present invention, the pouch 100 for a secondary battery may further include tab frames 143 for accommodating the electrode tabs 141 included in the electrode assembly 200 on one side of the frame unit 130 or two opposite sides of the frame unit 130. In this case, the electrode tabs 141 of the electrode assembly 200 may be fixed by penetrating through the tab frames 143 of the frame unit 130. Since the pouch 100 for a secondary battery may further include the tab frames 143, the electrode tabs 141 included in the electrode assembly 200 may be easily fixed.

The tab frames 143 are formed of a typically used insulating material and are not particularly limited. However, the tab frames 143 may be formed of an insulating material such as polypropylene (PP).

As illustrated in FIG. 4, according to a third embodiment of the present invention, the tab frames 143 formed on one side of the frame unit 130 or respectively on two opposite sides of the frame unit 130 of the pouch 100 for a secondary battery may include electrode leads 145. The electrode leads 145 may be formed by extending from the tab frames 143, and the electrode leads 145 in the form of a long thin metal plate may be electrically connected to the electrode tabs 141 included in the electrode assembly 200. Thus, in a case where the electrode assembly 200 is installed in the frame unit 130 in a subsequent assembly process, the electrode leads 145 included in the frame unit 130 may simplify an assembly operation in the process. The electrode leads 145 may be connected to the tab frames 143 using a typical welding process.

Figure 5A:
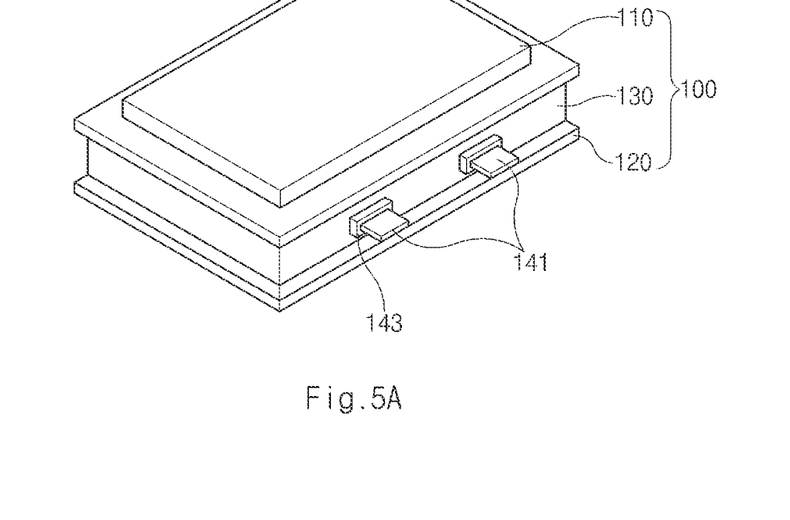
FIGS. 5A and 5B, as combined views of FIG. 3, are schematic views respectively illustrating pouches for a secondary battery which include tab frames capable of accommodating electrode tabs included in an electrode assembly on one side (FIG. 5A) or respectively on two sides (FIG. 5B) of a frame unit.
Figure 5B:
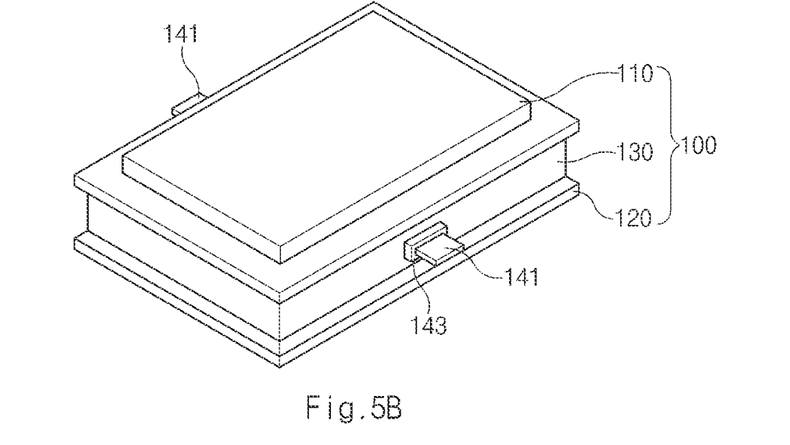

FIGS. 5A and 5B illustrate combined views of FIG. 3.

That is, FIGS. 5A and 5B are schematic views respectively illustrating the pouches 100 for a secondary battery which include the tab frames 143 capable of accommodating electrode tabs included in an electrode assembly on one side or two sides of a frame unit.

The pouches 100 for a secondary battery including the tab frames 143 may be sealed by the first sheet 110 and the second sheet 120, and as illustrated in FIG. 5A, the frame unit 130 may include the tab frames 143 for accommodating the electrode tabs 141 included in the electrode assembly on one side of the frame unit 130. In this case, the electrode tabs 141 may include a cathode tab and an anode tab, and the cathode tab and the anode tab may extend outward in the same direction from the electrode assembly.

Also, as illustrated in FIG. 5B, the frame unit 130 may include the tab frames 143 for accommodating the electrode tabs 141 included in the electrode assembly respectively on two opposite sides of the frame unit 130. In this case, a cathode tab and an anode tab, which are included in the electrode assembly, may extend outward in two directions from the electrode assembly.

As examples of including the tab frames 143 according to an embodiment of the present invention, FIGS. 5A and 5B only illustrate the schematic views according to the directions in which the electrode tabs may be accommodated. However, the examples are equally applicable according to various embodiments of the present invention.

Figure 6:
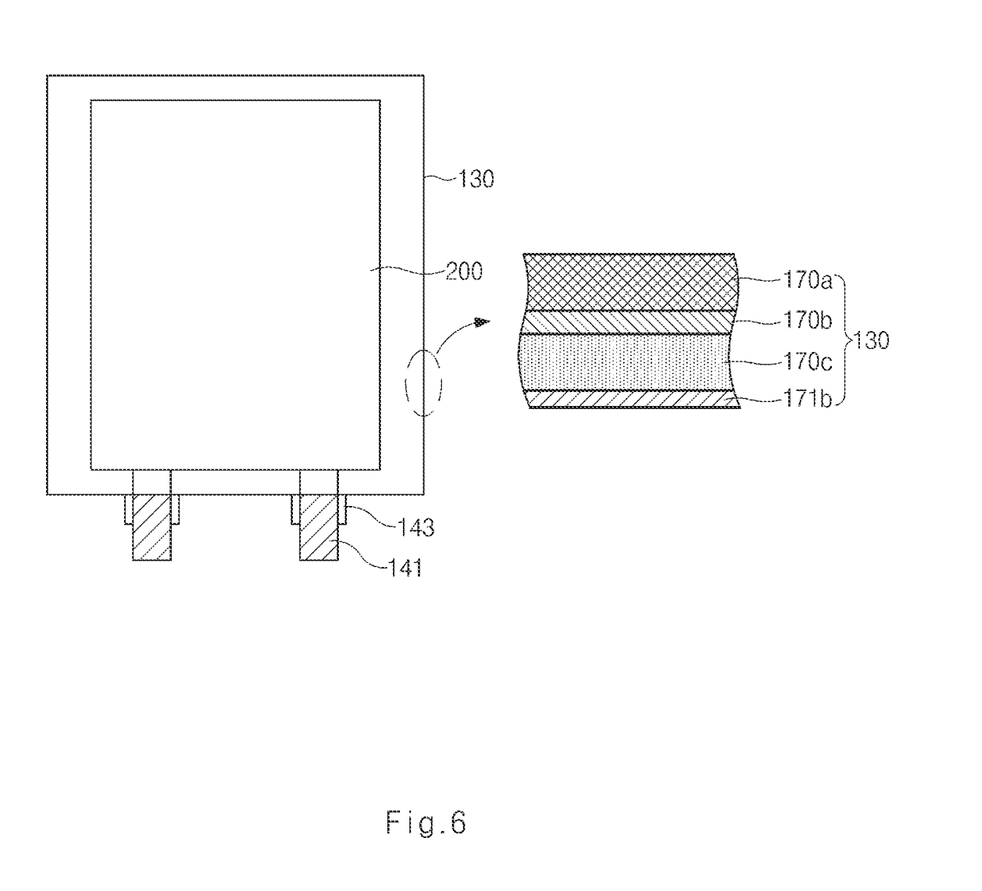
FIG. 6 is a cross-sectional view illustrating the pouch for a secondary battery according to the first embodiment of the present invention.

FIG. 6 is a top sectional view illustrating a pouch for a secondary battery, in which the electrode assembly 200 including the electrode tabs 141 is included in the frame unit 130 including the tab frame 143, according to an embodiment of the present invention.

According to an embodiment of the present invention, as an enlarged side view of the frame unit 130 illustrated in FIG. 6, the frame unit 130 may include a first polymer resin layer 170a, a second polymer resin layer 170c, and a first barrier layer 170b disposed between the first polymer resin layer 170a and the second polymer resin layer 170c.

The first barrier layer 170b may prevent the penetration of water vapor or gas from the outside to the inside of the frame unit 130 and may also prevent the leakage of an electrolyte solution.

A material of the first barrier layer 170b is not particularly limited so long as it may exhibit the above effects, and for example, may include any one selected from the group consisting of aluminum (Al); steel use stainless (SUS); an alloy of iron (Fe), carbon (C), chromium (Cr), and manganese (Mn); an alloy of Fe, C, Cr, and nickel (Ni); copper (Cu); and an equivalent thereof, or a mixture of two or more thereof.

According to an embodiment of the present invention, at least one second barrier layer 171b may be further included on the second polymer resin layer 170c in order to further prevent the penetration of moisture from the outside.

According to an embodiment of the present invention, the first and second barrier layers may have thicknesses in a range of 1 mm to 5 mm.

The first polymer resin layer and the second polymer resin layer may each independently include any one selected from the group consisting of Nylon, polyethylene (PE), polypropylene (PP), urethane, polyethylene terephthalate (PET), polyimide (PI), cast polypropylene (CPP), and fluorinated resin, or a mixture of two or more thereof.

Figure 7:
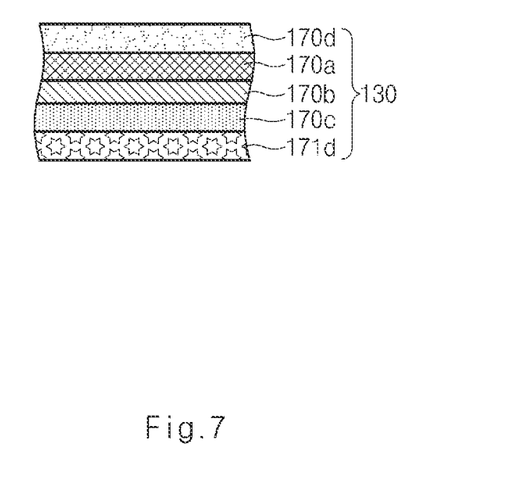
FIG. 7 is an enlarged side view illustrating the pouch for a secondary battery including a surface treatment layer according to the first embodiment of the present invention.

According to an embodiment of the present invention, as illustrated in FIG. 7, at least one of surface treatment layers 170d and 171d may be further included on outer sides of the first polymer resin layer 170a and the second polymer resin layer 170c in order to improve the adhesion to the first sheet and the second sheet.

For example, as illustrated in FIG. 7, a first polymer resin layer 170a, a second polymer resin layer 170c, and a first barrier layer 170b disposed between the first polymer resin layer 170a and the second polymer resin layer 170c may be included, and the first surface treatment layer 170d and the second surface treatment layer 171d may be respectively included on the outer sides of the first polymer resin layer 170a and the second polymer resin layer 170c.

The surface treatment layers 170d and 171d may be a silane-based compound or a siloxane-based compound, and for example, may be a silane-based compound and/or a siloxane-based compound having hydrophobicity.

The surface treatment layers 170d and 171d may be formed by coating the first polymer resin layer 170a and/or the second polymer resin layer 170c. The coating method is not particularly limited, and the coating method may be selected from the known methods or the coating may be performed by an appropriate new method. For example, a surface of a conductive material may be coated with a hydrophobic material by a chemical vapor deposition (CVD) method or a physical vapor deposition (PVD) method. A fluidized bed CVD method, a rotating-disk CVD method, or a vacuum CVD method may be used as the CVD method, and sputtering, a vacuum evaporation method, or a plasma coating method may be used as the PVD method. A material, such as an aromatic compound or a solvent containing chlorine, may be used as the hydrophobic material. However, a silane-based compound and/or a siloxane-based compound, which simultaneously exhibit further improved effects of adhesion and hydrophobicity, may be used.

Examples of the silane-based compound may be at least one selected from the group consisting of a vinyl silane compound such as vinyltrichlorosilane, vinyl tris(2-methoxyethoxy)silane, vinyltriethoxysilane, and vinyltrimethoxysilane; a methacrylic silane compound such as 3-methacryloxypropyltrimethoxysilane and 3-methacryloxypropyltriethoxysilane; an epoxy-based silane compound such as 2-(3,4-epoxycyclohexyl)-ethyltrimethoxysilane, 3-glycidoxypropyltrimethoxysilane, and 3-glycidoxypropyltriethoxysilane; an amino-based silane compound such as N-2-(aminoethyl)-3-aminopropylmethyldimethoxysilane, N-2-(aminoethyl)-3-aminopropyltrimethoxysilane, N-phenyl-3-aminopropyltrimethoxysilane, 3-aminopropylmethyldiethoxysilane, 3-aminopropyltrimethoxysilane, and 3-aminopropyltriethoxysilane; an alkoxy-based silane compound such as 3-chloropropyltrimethoxysilane and 3-chloropropyltriethoxysilane; 3-mercaptopropyltrimethoxysilane, and 3-mercaptopropyltriethoxysilane. However, the silane-based compound is not limited thereto.

Also, examples of the siloxane-based compound may be at least one selected from the group consisting of polymethylsiloxane, polydimethylsiloxane, polymethylvinylsiloxane, polymethylphenylsiloxane, oxyethylene modified siloxane, polymethylhydrogensiloxane, and octamethylcyclotetrasiloxane.

Examples of the surface treatment layer may be any one selected from the group consisting of hexamethyldisilazane (HMDS), trimethyl chlorosilane (TMSCL), silicone oil, amino silane, alkyl silane, polydimethyl siloxane (PDMS), and dimethyl dichlorosilane (DDS), or a mixture of two or more thereof.

Since the surface treatment layer is formed of a substituent having relatively low chemical reactivity, the surface treatment layer does not cause a side reaction in an electrochemical reaction system including a polar solvent. Thus, the surface treatment layer may prevent the performance degradation and capacity decrease of a battery and may exhibit excellent water repellency. As a result, the surface treatment layer may significantly improve the high-temperature storage performance of the battery.

Also, the surface treatment layer may further include a hydrophobic inorganic material including any one selected from the group consisting of $SiO_2$, $Al_2O_3$, MgO, $BaTiO_3$, $ZrO_2$, and ZnO, or a mixture of two or more thereof. However, the surface treatment layer is not limited thereto.

Figure 8:
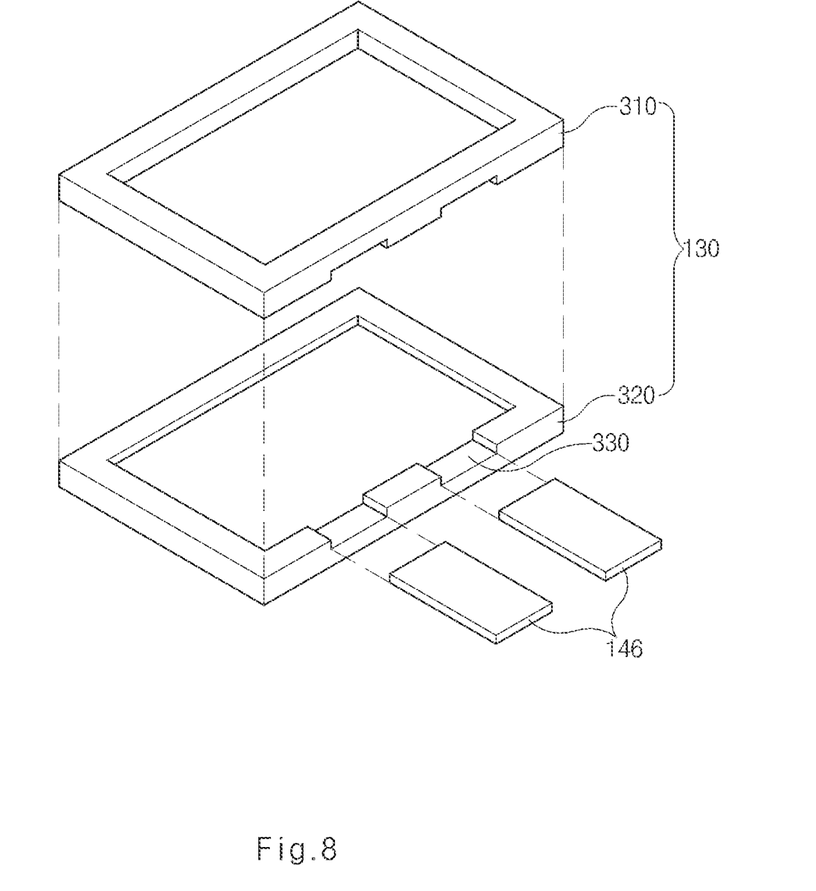
FIG. 8 is a schematic view illustrating a structure of a frame unit according to an embodiment of the present invention.

According to another embodiment of the present invention, as illustrated in FIG. 8, the frame unit 130 may include a first frame sheet 310 and a second frame sheet 320, and may include grooves 330, through which electrode tabs included in the electrode assembly may penetrate, on one side of the first frame sheet 310 and the second frame sheet 320 or respectively on two opposite sides of the first frame sheet 310 and the second frame sheet 320. The electrode assembly is accommodated, and the first frame sheet 310 and the second frame sheet 320 may then be laminated to form the frame unit 130.

Specifically, the first frame sheet 310 and the second frame sheet 320 may be first prepared, and in this case, each of the first frame sheet 310 and the second frame sheet 320 may include the grooves 330 through which the electrode tabs of the electrode assembly penetrate. Also, the electrode tabs of the electrode assembly penetrating through the grooves 330 may be respectively inserted into separate tab frames 146 and thus, the electrode tabs may be easily fixed.

That is, the electrode assembly is inserted in a state in which the first frame sheet 310 is temporarily fixed. Thereafter, the second frame sheet 320 is laminated with the first frame sheet 310 to cover the electrode assembly, and sealing may be performed by a typical method using heat and pressure.

Similar to the frame unit 130, each of the first frame sheet 310 and the second frame sheet 320 may include a first polymer resin layer 170a, a second polymer resin layer 170c, and a first barrier layer 170b disposed between the first polymer resin layer 170a and the second polymer resin layer 170c.

Also, the present invention may provide a secondary battery including the pouch for a secondary battery and an electrode assembly in the pouch.

The secondary battery may be a lithium secondary battery. However, the present invention is not limited thereto.

The electrode assembly used in the present invention may be classified as a jelly-roll (wound) type electrode assembly having a structure, in which long-sheet type cathodes and anodes are wound while separators are respectively disposed therebetween, and a stacked (laminated) type electrode assembly in which pluralities of cathodes and anodes having a predetermined size are sequentially stacked while separators are respectively disposed therebetween. For example, the electrode assembly may have a stacked type structure and a stacked/folded structure. Since the stacked type structure is well known in the art, the description thereof is omitted in the present specification. The details of the stacked/folded type electrode assembly are disclosed in Korean Patent Application Laid-Open Publication Nos. 2001-0082058, 2001-0082059, and 2001-0082060 of the present applicants, and the above publications are incorporated by reference into the content of the present invention.

Hereinafter, specific materials and structural features of components constituting the electrode assembly that is inserted into the above-described pouch according to the present invention will be described.

Cathode Structure

The unit electrode in the present invention is classified into a cathode and an anode. The cathode and the anode are mutually coupled to each other with a separator therebetween to manufacture the full cell and bi-cell. For example, the cathode may be manufactured by applying a mixture of a cathode active material, a conductive material, and a binder on a cathode collector and then performing drying and pressing processes on the cathode collector on which the mixture is applied. As necessary, a filler may be added to the mixture.

[Cathode Collector]

Generally, the cathode collector is fabricated to have a thickness of about 3 μm to about 500 μm. The cathode collector is not particularly limited so long as it has high conductivity without causing adverse chemical changes in the batteries. The cathode collector may be formed of, for example, stainless steel, aluminum, nickel, titanium, fired carbon, or aluminum or stainless steel that is surface-treated with one of carbon, nickel, titanium, silver, or the like. The collector may have an uneven surface to improve the bonding strength of a cathode active material and may have any of various shapes such as that of a film, a sheet, a foil, a net, a porous body, a foam body, a non-woven fabric body, and the like.

[Cathode Active Material]

In case of the lithium secondary battery, the cathode active material may include a layered compound such as lithium cobalt oxide ($LiCoO_2$) and lithium nickel oxide (LiNiO$_2$), or a compound substituted with at least one transition metal; a lithium manganese oxide such as the chemical formula Li$_{1+x}$Mn$_{2-x}$O$_4$ (where x ranges from about 0 to about 0.33), LiMnO$_3$, LiMn$_2$O$_3$, and LiMnO$_2$; lithium copper oxide (Li$_2$CuO$_2$); vanadium oxide such as LiV$_3$O$_8$, LiFe$_3$O$_4$, V$_2$O$_5$, and Cu$_2$V$_2$O$_7$; nickel (Ni)-site type lithium nickel oxide expressed by the chemical formula LiNi$_{1-x}$M$_x$O$_2$ (where M=Co, Mn, Al, Cu, Fe, Mg, B, or Ga, and x ranges from about 0.01 to about 0.3); lithium manganese complex oxide expressed by the chemical formula LiMn$_{2-x}$M$_x$O$_2$ (where M=Co, Ni, Fe, Cr, Zn, or Ta, and x ranges from about 0.01 to about 0.1) or Li$_2$Mn$_3$MO$_8$ (where M=Fe, Co, Ni, Cu, or Zn); LiMn$_2$O$_4$, with a part of lithium of a chemical formula being substituted with alkaline earth metal ions; a disulfide compound; or a complex oxide formed of Fe$_2$(MoO$_4$)$_3$, but the present invention is not limited thereto.

The conductive material is commonly added in an amount of about 1 to about 50% by weight on the basis of the total weight of the mixture including the cathode active material. Any conductive material may be used without particular limitation so long as it has suitable conductivity without causing adverse chemical changes in the batteries. For example, the conductive material may include conductive material such as: graphite such as natural graphite and artificial graphite; carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive oxide such as titanium oxide; or polyphenylene derivatives.

The binder is a component that assists in the binding between the active material and conductive material and in the binding with the collector. The binder is commonly added in an amount of about 1 to about 50% by weight on the basis of the total weight of the compound including the cathode active material. Examples of the binder may include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene butadiene rubber, a fluoro rubber, various copolymers, and the like.

The filler is a component selectively used to inhibit expansion of the anode. There is no particular limit to the filler, so long as it does not cause adverse chemical changes in the batteries and is a fibrous material. Examples of the filler may include olefin-based polymers such as polyethylene and polypropylene; and fibrous materials such as glass fibers and carbon fibers.

Anode Structure

The anode is formed by applying, drying, and pressing an anode active material on an anode collector. As necessary, the conductive material, the binder, and the filler may be further selectively added to the anode.

[Anode Collector]

The anode collector is generally fabricated to have a thickness of about 3 μm to about 500 μm. The anode collector is not particularly limited so long as it has conductivity without causing adverse chemical changes in the batteries. The anode collector may be formed of, for example, copper, stainless steel, aluminum, nickel, titanium, fired carbon, copper or stainless steel that is surface-treated with one of carbon, nickel, titanium, silver, or the like, an aluminum-cadmium alloy, or the like. Also, like the cathode collector, the anode collector may have a fine roughness surface to improve bonding strength with an anode active material. The anode collector may have various shapes such as a film, a sheet, a foil, a net, a porous body, a foam body, a non-woven fabric body, and the like.

[Anode Active Material]

For example, the anode active material may include: carbon such as hard carbon and graphite-based carbon; a complex metal oxide such as Li$_x$Fe$_2$O$_3$ (0≤x≤1), Li$_x$WO$_2$ (0≤x≤1), Sn$_x$Me$_{1-x}$Me'$_y$O$_z$ (Me:Mn, Fe, Pb, or Ge; Me':Al, B, P, Si, Groups I, II and III elements, or halogen; 0<x≤1; 0<x≤1; 1≤y≤3; 0≤x≤8); a lithium metal; a lithium alloy; a silicon-based alloy; a tin-based alloy; a metal oxide such as SnO, SnO$_2$, PbO, PbO$_2$, Pb$_2$O$_3$, Pb$_3$O$_4$, Sb$_2$O$_3$, Sb$_2$O$_4$, Sb$_2$O$_5$, GeO, GeO$_2$, Bi$_2$O$_3$, Bi$_2$O$_4$, and Bi$_2$O$_5$; a conductive polymer such as polyacetylene; or a Li—Co—Ni-based material.

[Separator]

Since the full cells are disposed on a long separator sheet and the separator sheet is then wound in a structure in which the separator sheet is included in an overlapping portion, each full cell may be stacked to make the cathode and the anode to face each other in a state in which a separator film is disposed therebetween. The separator sheet may have a length extending to wrap around the electrode assembly once after the winding, and outermost ends of the separator sheet may be fixed by heat fusion or taping. For example, the separator sheet itself is made to be fused by heat, bonded, and fixed by contacting the finished separator sheet with a thermal welder or a heat plate. Thus, a pressure may be continuously maintained to enable the electrodes to stably surface-contact the separator sheet.

The separator sheet or the separator interposed between the cathode and anode of a cell are not particularly limited in terms of material if the separator sheet or the separator has a porous structure in which ions are capable of moving. The separator and the separator sheet may or may not be formed of the same material.

As the separator or the separator sheet—for example, an insulating thin film having high ion permeability and mechanical strength—may be used. The separator or the separator sheet typically has a pore diameter of about 0.01 μm to about 10 μm and a thickness of about 5 μm to about 300 μm. For example, sheets or non-woven fabrics made of an olefin-based polymer such as polypropylene, glass fibers or polyethylene, which have chemical resistance and hydrophobicity, are used as the separator or the separator sheet. When a solid electrolyte such as a polymer is employed as the electrolyte, the solid electrolyte may also serve as the separator. The separator may be a polyethylene film, a polypropylene film, a multi-layered film made from combinations of these films, or a polymer film for a polymer electrolyte or gel-type polymer electrolyte such as polyvinylidene fluoride, polyethylene oxide, polyacrylonitrile, or a polyvinylidene fluoride hexafluoropropylene copolymer.

The separator may have an adhesion function through thermal bonding to constitute the full cell or bi-cell. The separator sheet may also (but not necessarily) have the adhesion function in order to facilitate a winding process.

Also, the present invention exemplifies a structure, in which an electrode is disposed on a single separator and the separator is wound in one direction or a zigzag direction in order to form the full cell or bi-cell. However, the present invention is not limited thereto. A structure, which is laminated by respectively disposing additional separators between a plurality of electrodes, may also be used.

The secondary battery according to the present invention may be used in a medium-large-sized battery module or a battery pack including the secondary battery as a unit cell. The medium-large-sized battery module or the battery pack may be used as a power source of one or more medium-large-sized devices from among an electric vehicle (EV) including an electric car, a hybrid electric vehicle (HEV), and a plug-in hybrid electric vehicle (PHEV); an electric truck; an electric commercial vehicle; and a power storage system.

The medium-large-sized battery module may be configured to provide high-output and large-capacity by connecting the plurality of unit cells to each other in series or in serial-parallel connection. However, since this structure is well-known in the art, a detailed description thereof will not be provided.

According to the present invention, since a structure of a pouch for a secondary battery may include a frame unit capable of accommodating a large electrode assembly, a high-capacity and large-area secondary battery having high capacity and high stiffness may be realized.

While the present invention has been shown and described in connection with the exemplary embodiments, it will be apparent to those skilled in the art that modifications and variations can be made without departing from the spirit and scope of the invention as defined by the appended claims.

What is claimed is:

1. A pouch for a secondary battery, the pouch comprising:
   a first sheet and a second sheet; and
   a frame unit which is sealed by the first sheet and the second sheet and includes an accommodating part for accommodating an electrode assembly including electrode tabs therein,
   wherein the frame unit comprises through holes on at least one side of the frame unit, and sealing parts protruding in a direction which the tabs project towards on both sides of the through holes such that the perimeter of each sealing part is greater than a perimeter of the accommodating part, and
   wherein the electrode tabs of the electrode assembly penetrate through the through holes of the frame unit.

2. The pouch for a secondary battery of claim 1, wherein the frame unit comprises tab frames for accommodating the electrode tabs included in the electrode assembly on one side of the frame unit, and
   the electrode tabs of the electrode assembly are fixed by penetrating through the tab frames of the frame unit.

3. The pouch for a secondary battery of claim 1, wherein the electrode tabs include a cathode tab and an anode tab, and the cathode tab and the anode tab extend outward in the same direction from the electrode assembly.

4. A pouch for a secondary battery, the pouch comprising:
   a first sheet and a second sheet; and
   a frame unit which is sealed by the first sheet and the second sheet and includes an accommodating part for accommodating an electrode assembly including electrode tabs therein,
   wherein the frame unit comprises through holes, through which the electrode tabs included in the electrode assembly penetrate, respectively, on two opposite sides of the frame unit, and sealing parts protruding in a direction which the tabs project towards on both sides of the through holes such that the perimeter of each sealing part is greater than a perimeter of the accommodating part, and
   the electrode tabs of the electrode assembly penetrate through the through holes.

5. The pouch for a secondary battery of claim 4, wherein the frame unit comprises tab frames for accommodating the electrode tabs included in the electrode assembly respectively on two opposite sides of the frame unit, and
   the electrode tabs of the electrode assembly are fixed by penetrating through the tab frames.

6. The pouch for a secondary battery of claim 4, wherein the electrode tabs include a cathode tab and an anode tab, and the cathode tab and the anode tab extend outward in two directions from the electrode assembly.

7. The pouch for a secondary battery of claim 5, wherein the frame unit further comprises electrode leads that are formed by extending from the tab frames.

8. The pouch for a secondary battery of claim 1, wherein the frame unit comprises:
   a first frame sheet and a second frame sheet; and
   grooves, to form the through holes, on one side of the first frame sheet and the second frame sheet or respectively on two opposite sides of the first frame sheet and the second frame sheet,
   wherein the frame unit is formed by accommodating the electrode assembly including the electrode tabs and laminating the first frame sheet and the second frame sheet.

9. The pouch for a secondary battery of claim 8, further comprising tab frames.

10. The pouch for a secondary battery of claim 1, wherein the frame unit comprises a first polymer resin layer, a second polymer resin layer, and a first barrier layer disposed between the first polymer resin layer and the second polymer resin layer,
    wherein the first barrier layer comprises any one selected from the group consisting of aluminum (Al); steel use stainless (SUS); an alloy of iron (Fe), carbon (C), chromium (Cr), and manganese (Mn); an alloy of Fe, C, Cr, and nickel (Ni); copper (Cu); and an equivalent thereof, or a mixture of two or more thereof.

11. The pouch for a secondary battery of claim 10, wherein the first polymer resin layer and the second polymer resin layer each independently comprise any one selected from the group consisting of Nylon, polyethylene (PE), polypropylene (PP), urethane, polyethylene terephthalate (PET), polyimide (PI), cast polypropylene (CPP), and fluorinated resin, or a mixture of two or more thereof.

12. The pouch for a secondary battery of claim 10, further comprising a second barrier layer on an outer side of the second polymer resin layer.

13. The pouch for a secondary battery of claim 12, wherein the second barrier layer comprises any one selected from the group consisting of Al; SUS; an alloy of Fe, C, Cr, and Mn; an alloy of Fe, C, Cr, and Ni; Cu; and an equivalent thereof, or a mixture of two or more thereof.

14. The pouch for a secondary battery of claim 1, wherein the frame unit has a height in a range of 7 mm to 50 mm.

15. The pouch for a secondary battery of claim 12, wherein the first and second barrier layers have thicknesses in a range of 1 mm to 5 mm.

16. The pouch for a secondary battery of claim 10, further comprising a surface treatment layer on the first polymer resin layer and the second polymer resin layer.

17. The pouch for a secondary battery of claim 16, wherein the surface treatment layer is a silane-based compound or a siloxane-based compound.

18. The pouch for a secondary battery of claim 16, wherein the surface treatment layer is any one selected from the group consisting of hexamethyldisilazane (HMDS), trimethyl chlorosilane (TMSCL), silicone oil, amino silane, alkyl silane, polydimethyl siloxane (PDMS), and dimethyl dichlorosilane (DDS), or a mixture of two or more thereof.

19. A secondary battery comprising the pouch for a secondary battery of claim 1 and an electrode assembly in the pouch.

20. A medium-large-sized battery module or a battery pack comprising the secondary battery of claim 19.

21. The medium-large-sized battery module or the battery pack of claim 20, wherein the medium-large-sized battery module or the battery pack is used as a power source of one or more medium-large-sized devices from among an electric vehicle (EV) including an electric car, a hybrid electric vehicle (HEV), and a plug-in hybrid electric vehicle (PHEV); an electric truck; an electric commercial vehicle; and a power storage system.

* * * * *